Figure 1:
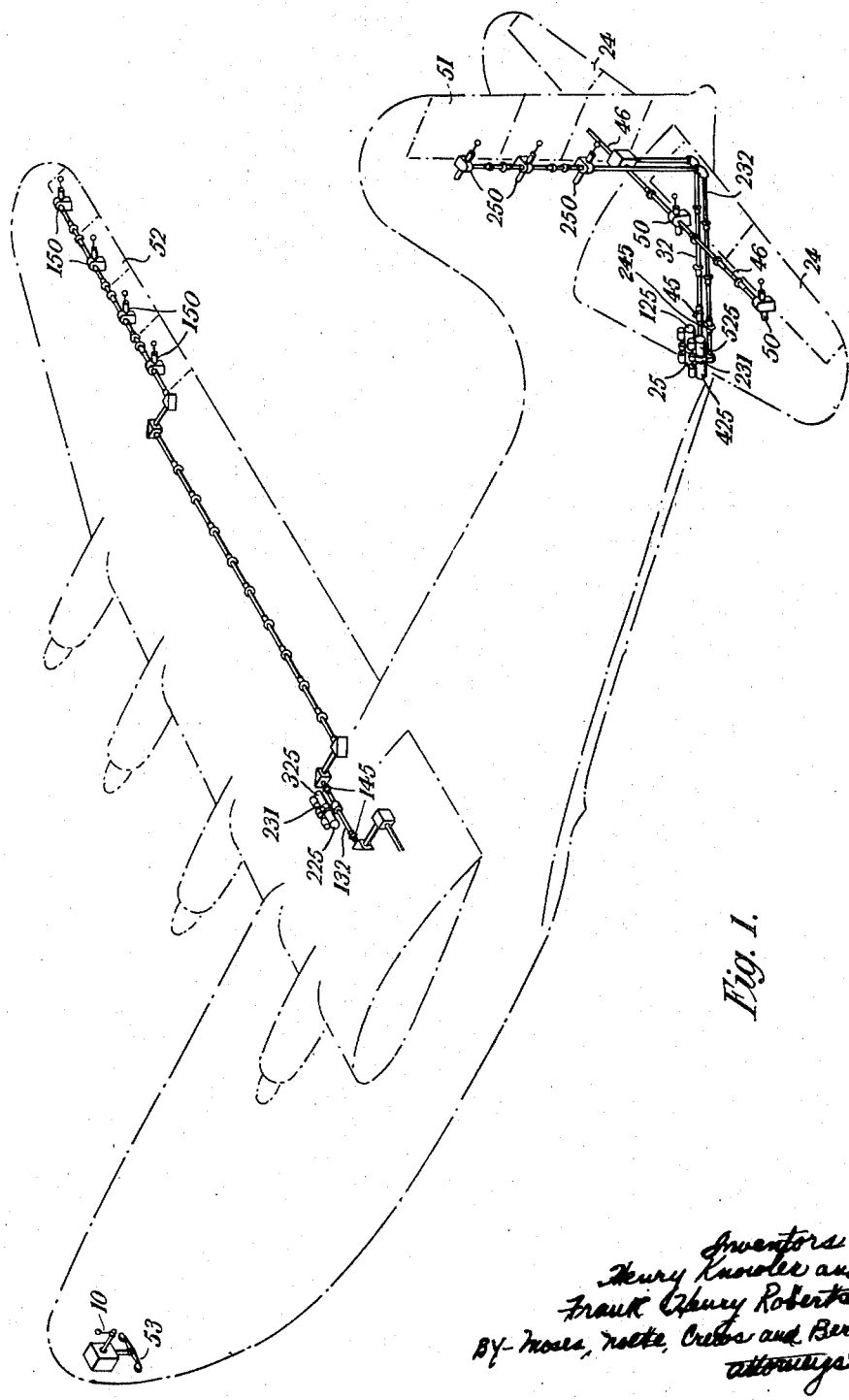

Aug. 8, 1950     H. KNOWLER ET AL     2,517,680
FLYING CONTROL FOR AIRCRAFT

Filed Nov. 29, 1947     6 Sheets-Sheet 1

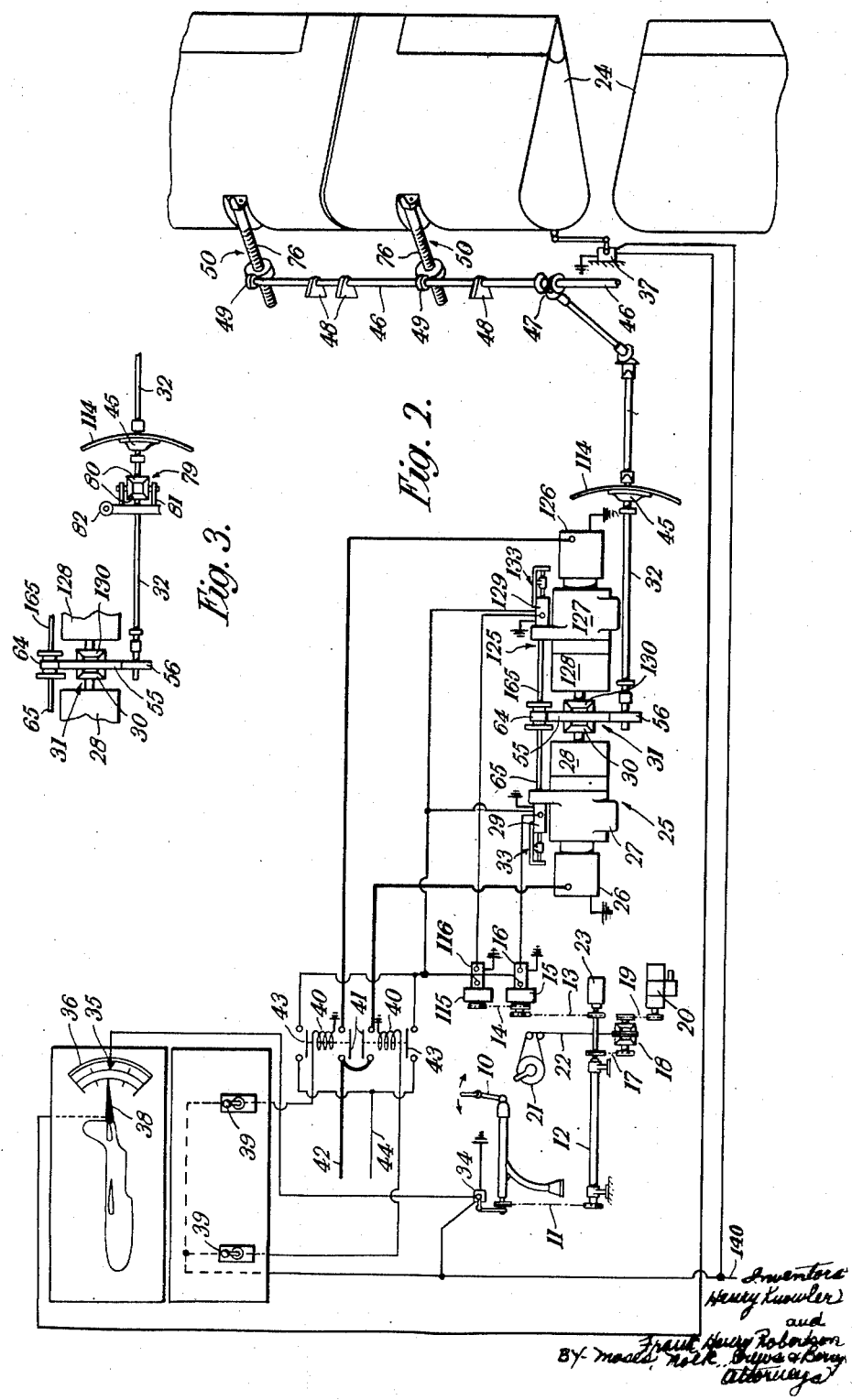

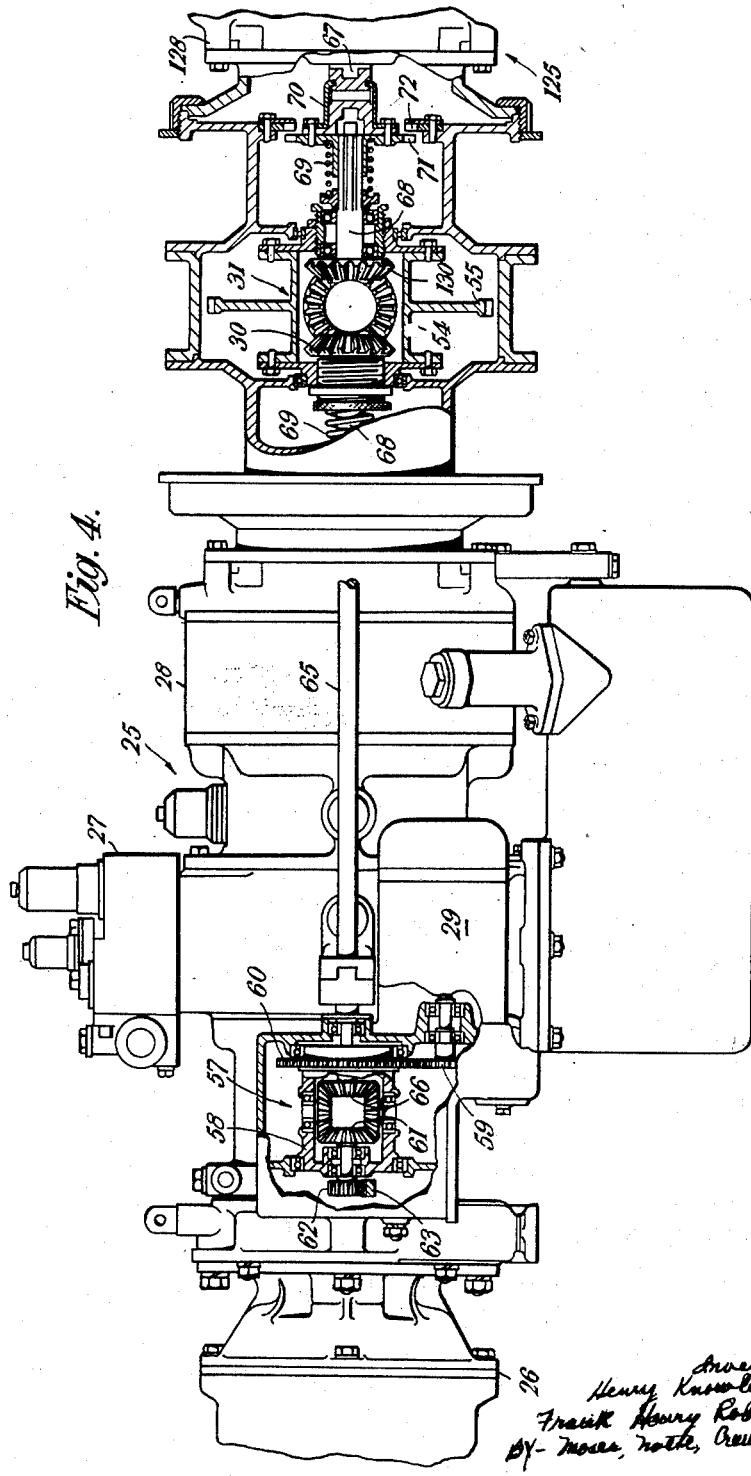

Inventors
Henry Knowler &
Frank Henry Robertson

Patented Aug. 8, 1950

2,517,680

UNITED STATES PATENT OFFICE 2,517,680

FLYING CONTROL FOR AIRCRAFT

Henry Knowler, Ryde, and Frank Henry Robertson, Carisbrooke, Isle of Wight, England, assignors to Saunders-Roe Limited, East Cowes, Isle of Wight, England Application November 29, 1947, Serial No. 788,869
In Great Britain October 7, 1946

Section 1, Public Law 690, August 8, 1946
Patent expires October 7, 1966

12 Claims. (Cl. 244—85)

1

The object of this invention is to provide for power operation of the control surfaces of an aircraft.

The invention provides, in an aircraft, a power operated flying control system, comprising in combination with a pilot's control member and a control surface to be operated thereby, a pair of power units linked to the pilot's control member and each arranged, on displacement of the control member, to execute a movement corresponding in amount and direction to the movement of the control member, a torque shaft, a differential gear coupling the power units to the torque shaft, an irreversible mechanical driving gear for imparting movement from the torque shaft to the control surface, and means for preventing reverse rotation of either power unit, should it fail, by the other power unit.

By virtue of the provision of a pair of power units driving the torque shaft through a differential gear, the system is safeguarded against failure to the extent that, should either power unit fail, the other can continue to operate the control surface through the agency of the differential gear. A degree of irreversibility is provided, either in the power units themselves or in the drives between the power units and the differential gear, so that the failed power unit will not be driven in reverse by the other and still operating power unit.

The irreversible drive between the torque shaft and the control surface ensures that loads on the control surface will not be transmitted back through the system, so introducing flexibility and the possibility of flutter in the control surface. By this means the mass balancing of the surface which is at present found necessary, is obviated.

Among other advantages of the arrangement according to the invention, no parking lock is required for the control surface, no mass balancing of the control surface is needed, no power is required to hold the control surface against the aerodynamic load, and no direct structural connection is required between two or more parts of a control surface. Thus, in the case of an elevator, the two parts thereof which are located on opposite sides of the fin can be operated simultaneously and in synchronism, by a single power operated irreversible mechanical drive, and a substantial weight can be saved by the elimination of any structural connection between the two parts.

In the case of an aircraft fitted with a pressure cabin it is preferred to dispose the power units within the pressure cabin. The power units can be operated directly by the pilot's control member. In the case of large aircraft, however, in which the pilot's cockpit is located at some distance from the end of the cabin, it is preferred to dispose the power units at the end of the cabin nearest the control surface, and to operate them by master and slave units from the control column, these comprising a transmitter connected to the control member and a receiver connected to the power unit, the receiver following the movement imparted to the transmitter.

Figure 5:
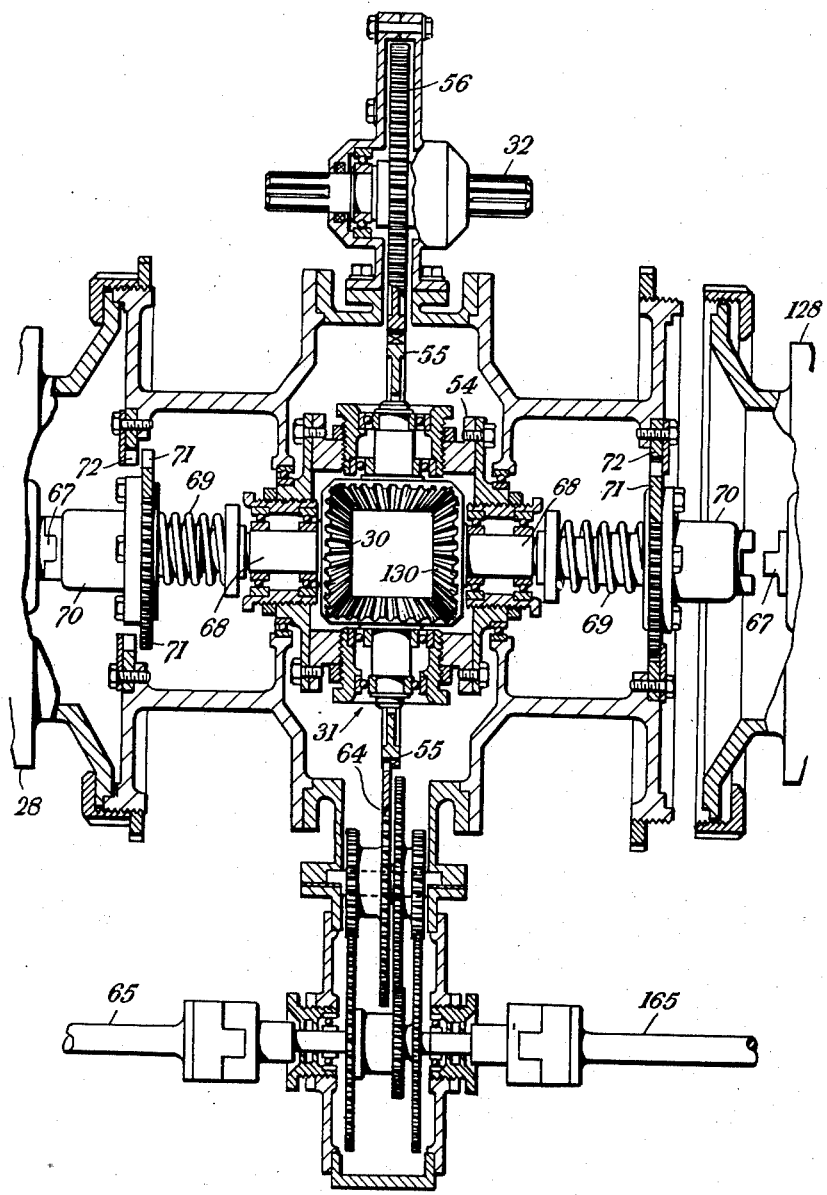
Figure 6:
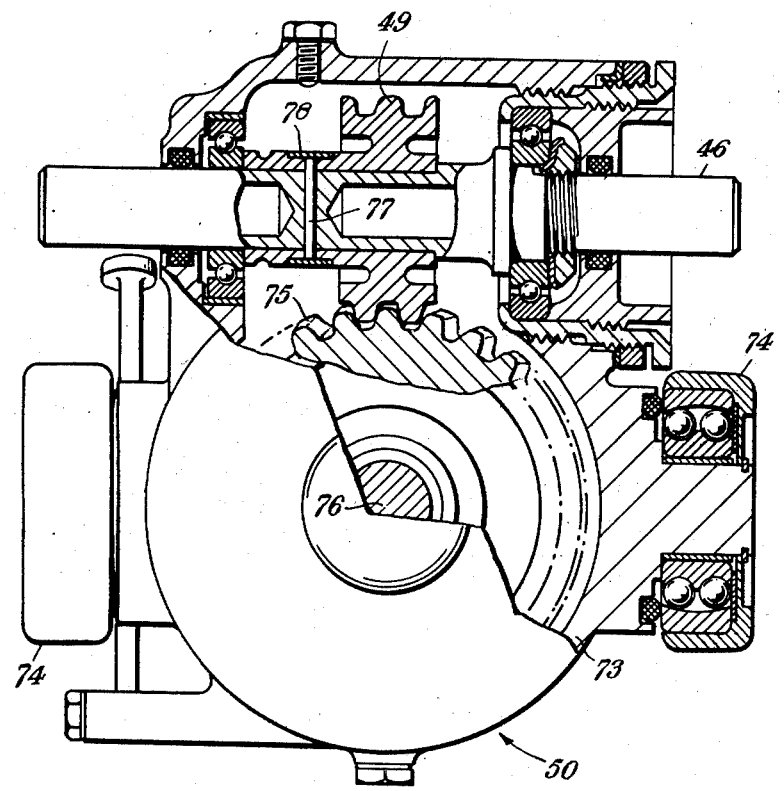
Figure 7:
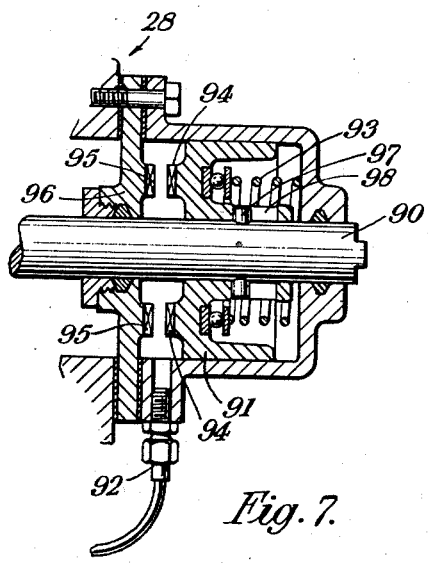
Figure 8:
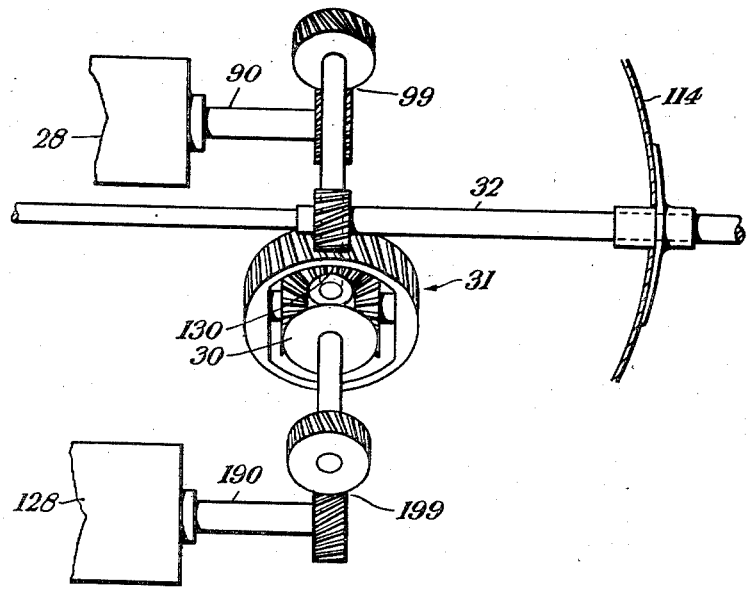

One specific embodiment of the invention will now be described in detail, by way of example, with reference to the accompanying drawings, in which:

Fig. 1 is a perspective view of an aircraft showing the pilot's controls and the power units for operating the various control surfaces, Fig. 2 is a diagram showing the power operation of the elevator, Fig. 3 is a diagram showing a modified arrangement of the system shown in Fig. 2, Fig. 4 is a side elevation, partly in section, of one of the power units and the differential gear, Fig. 5 is a sectional plan of the differential gear, showing one of the power units removed, Fig. 6 is an elevation, partly in section, of one of the screw jacks, Fig. 7 is a diagrammatic sectional view through a lock employed in one of the hydraulic motors, and Fig. 8 is a diagram of a modification including irreversible drives between the hydraulic motor and the differential gear.

Like reference numerals denote like parts throughout the figures.

Considering first of all Fig. 2, fore and aft movement of the pilot's control column 10 is effective, through a chain drive 11, to rotate a shaft 12 and thence, through chain drives 13, 14 and gear boxes 15, 115 to effect corresponding adjustment of a pair of electrical transmitters 16, 116 of the Selsyn type. Coupled to the shaft 12, through chain drive 17, differential gear 18 and chain drive 19 is a feel generator 20, which may be of the hydraulic type described in U. S. application Serial No. 788,868 or of the mechanical type described in U. S. application Serial No. 790,774, now U. S. Patent No. 2,508,883, issued on May 23, 1950. A trimmer 21 is connected to the planet carrier of the differential gear 18 by a cable 22, and 23 is an automatic pilot.

The elevator 24 is operated by twin power units 25, 125. Power unit 25 is constituted by a constantly running constant speed electric motor 26, a variable delivery hydraulic pump 27 driven by the motor 26 and a hydraulic motor 28 driven by the pump 27. The pump 27 has a control lever or the like by which its delivery can be adjusted to correspond in direction and extent to the movement imparted to the control column 10. Normally the pump 27 is not delivering fluid. When, however, the control column is moved an electrical receiver 29 of the Selsyn type is positioned by the transmitter 16 and effects appropriate adjustment of the control lever of the pump 27.

The power unit 125 is of identical construction to power unit 25, the individual parts thereof being identified by corresponding numbers, prefaced by the digit 1.

The hydraulic motors 28, 128 drive the sun wheels 30, 130 of a differential gear 31, from which, as explained later in more detail, movement is imparted to a torque shaft 32 for operating the elevator 24. The control levers of the pumps 27, 127 are returned to neutral position, likewise as explained later in more detail, by means of follow-up gears 33, 133.

The power units 25, 125 will not be described in detail because they are of known construction. Each power unit constitutes an electro-hydraulic torque converter, the constant-speed variable-torque output of the electric motor being converted into a variable speed delivery and the speed of the hydraulic motor being determined by the speed at which the control member of the pump is moved by the pilot away from its neutral position. The power units thus give control not only of the position but of the rate of movement of the associated control surfaces, which is a necessary requirement in the case of the rudder, elevator and ailerons. Each of the hydraulic motors 28, 128 embodies a lock of the kind shown in Fig. 7. Slidably but non-rotatably mounted on the shaft 90 of the hydraulic motor is a piston 91, a pin 97 fixed to the shaft engaging a slot 98 in the piston. The piston 91 is normally held against a spring 93 by hydraulic pressure admitted through an inlet 92, in the position shown in Fig. 7. In the event of failure of the hydraulic pressure, however, the spring 93 will move the piston 91 to the left to engage teeth 94 thereon with teeth 95 on a fixed member 96, so locking the shaft 90 against rotation. When either of the power units fails, it is thus locked against reverse rotation, through the differential gear 31, by the other power unit, so that the other power unit will be effective to operate the elevator. As an alternative to providing locking devices in the power units, an irreversible drive could be introduced between each power unit and the differential gear 31, so as to prevent reverse rotation of a failed power unit by the other power unit. Such an arrangement is shown in Fig. 8. Here the shafts 90, 190 of the hydraulic motors 28, 128 drive the sun wheels 30, 130 of the differential gear through irreversible spiral drives 99, 199. The follow-up gear is not shown in Fig. 8, but this may be of similar construction to that shown in Fig. 2.

Movement of the control column 10 actuates an electrical transmitter 34 of the Dessyn type to effect appropriate positioning of a pointer 35 on a scale 36 visible to the pilot. Pointer 35 thus shows the selected position of the elevator. Movement of the elevator 24 actuates a second Dessyn transmitter 37 to position another pointer 38 to show the actual position of the elevator. When the apparatus is working properly, pointers 35, 38, which move on coaxial pivots, are in alignment on the scale.

When switches 39 are moved to "on" position from the "off" position shown in Fig. 2, relays 40 are energised from a power supply line 140 which serves also to supply power to the Dessyn transmitters 34, 37, thereby causing contacts 41 to close to connect the motors 26, 126 to a power supply line 42 and start the motors, and causing contacts 43 to close to connect the transmitters 16, 116 and receivers 29, 129 to a power supply line 44.

The power units 25, 125 are located near the rear wall 114 of the pressure cabin of the aircraft, through which the torque shaft 32 extends rearwardly, a suitable seal 45 preventing escape of air from the pressure cabin. The torque shaft 32 drives, through bevel gears 47 a pair of cross shafts 46 associated respectively with the port and starboard halves of the elevator 24, each of which is divided into two sections as shown. Each cross shaft 46 is supported in self-aligning bearings, indicated at 48, and drives, through a worm drive 49, a screw jack 50 associated with each section of the elevator.

Fig. 1 shows the layout of the flying controls for the elevator 24, rudder 51 and ailerons 52, the transmitter units being omitted for the sake of clarity. Fore and aft movement of the control column 10 effects remote operation of duplicated power units 25, 125 as already described, to actuate the elevator 24 through the torque shaft 32, which passes out of the pressure cabin through the seal 45. Lateral movement of the control column operates in precisely similar fashion, duplicated power units 225, 325 acting through a differential gear 231 on torque shafts 132, which pass out from the pressure cabin through seals 145, and operate the ailerons 52 through screw jacks 150. In precisely similar fashion, movement of the rudder bar 53 effects remote operation of duplicated power units 425, 525 which drive a torque shaft 232 through a differential gear 231. The torque shaft 232, which leaves the pressure cabin through a seal 245, actuates the rudder 51 through screw jacks 250.

Turning now to Figs. 4 and 5, the planet carrier 54 of the differential gear 31 carries a gear wheel 55 which meshes with a gear wheel 56 fixed to the torque shaft 32. As the sun wheels 30, 130 are rotated in same direction by their respective power units, the planet carrier 54 will be continuously rotated to drive the torque shaft 32. Associated with each power unit is a secondary differential gear 57 (Fig. 4). The receiver unit 29 serves to drive the planet carrier 58 of the secondary differential gear through gears 59, 60, thereby, through sun wheel 61 and pinion 62, adjusting a rack 63 coupled to the control lever (not shown) of the pump 28 to adjust the control lever appropriately to the setting imparted to the control column 10. As shown in Fig. 5, the gear wheel 55 drives, through gearing indicated generally by the reference 64, a pair of follow-up shafts 65, 165 associated one with each power unit. As shown in Fig. 4, follow-up shaft 65 serves to drive the sun wheel 66 of differential gear 57, to turn sun wheel 61 in the direction reverse to that in which it was turned by the receiver 29, thereby causing rack 63 to return the control lever of the pump 27 to neutral position when the elevator has moved to the position selected by the control column.

The differential gear 31 is provided with extractor locks, by means of which, when either power unit is removed for inspection or replacement, the associated sun wheel is locked against rotation. As shown in Fig. 5, the motors 28, 128 drive their associated sun wheels 30, 130 through clutches 67 and shafts 68. The clutch coupling members 70 nearest the sun wheels are splined to and slidable along their respective shafts, and urged outwardly by springs 69. Normally, i. e. when the power units are in position, the clutch coupling members 70 are held in against their springs 69 as shown at the left hand side of Fig. 5. When however a power unit is removed, as shown at the right hand side of Fig. 5, the spring 69 can move the coupling member 70 outwards to bring a pinion 71 carried thereby into mesh with a fixed pinion 72, thereby locking the associated sun wheel against rotation, so that the remaining power unit can continue to drive the torque shaft.

As a safeguard against jack seizure, each screw jack is provided with a shear key, as shown in Fig. 6. As shown in Fig. 2, the ailerons and rudder are divided into at least three sections each driven by an individual screw jack. Should any jack seize, and sufficient torque is applied to the shaft driving it, its shear key will fail, freeing the shaft to enable it to continue to operate the jacks associated with the other sections of the control surface. As the shearing torque is shared between the shear keys of the jacks associated with the other sections, these will not fail. The elevator is divided into four sections, and the shearing torque applied to the shear key of any of the associated jacks will be shared among the shear keys of the remaining three, being transmitted thereto through the cross shafts 46 and bevel gears 47.

Turning now to Fig. 6, each screw jack comprises a housing 73 mounted in trunnion bearings 74, and containing a worm wheel 75, meshing with the worm 49 on the cross shaft 46, and constituting a nut for imparting movement to a screwed shaft 76 for operating the control surface. The worm 49 is connected to the shaft 46 by a shear key 77 held in position by a split ring 78. If the shear key 77 fails, due to seizure of the jack, the shaft 46 can thereafter rotate freely in the worm 49.

As shown in Fig. 3, in the case of the elevator, an additional safety mechanism may be provided for allowing the elevator to be returned to central position in the event of failure of both power units. To this end, an additional differential gear 79 is interposed in the torque shaft 32 between the motor driven differential gear 31 and the rear wall 114 of the pressure cabin, the sun wheels 80 of this second differential gear being secured to the two parts of the torque shaft. The planet carrier 81 is irreversibly geared, by a worm drive 82, to a normally inoperative auxiliary electric motor (not shown), so that the second differential gear normally operates merely to reverse the direction of drive of the torque shaft. By operating a two-way emergency switch, however, the pilot can cause the auxiliary electric motor to operate in forward or reverse direction to move the elevator accordingly.

What we claim as our invention and desire to secure by Letters Patent is:

1. In an aircraft, the combination, with a pilot's control member and a control surface to be operated thereby, of a torque shaft, an irreversible mechanical driving gear located adjacent the control surface for imparting movement from the torque shaft to the control surface, a pair of variable speed power units, a differential gear coupling the power units to the torque shaft, connections between the pilot's control member and the power units for rendering the power units operative, on movement of the pilot's control member, to move the control surface in a direction and at a rate determined by the movement of the pilot's control member, means for terminating operation of the power units on arrival of the control surface at a position selected by the movement of the control member, and means for preventing reverse rotation of either power unit, should it fail, by the other power unit.

2. In an aircraft, the combination, with a pilot's control member and a control surface to be operated thereby, of a torque shaft, an irreversible mechanical driving gear located adjacent the control surface for imparting movement from the torque shaft to the control surface, a pair of electro hydraulic torque converters, a differential gear coupling the torque converters to the torque shaft, connections between the pilot's control member and the torque converters for rendering the torque converters operative, on movement of the control member, to move the control surface in a direction and at a rate determined by the movement of the pilot's control member, means for terminating operation of the power units on arrival of the control surface at a position selected by the movement of the control member, and means for preventing reverse rotation of either torque converter, should it fail, by the other torque converter.

3. In an aircraft, the combination, with a pilot's control member and a control surface to be operated thereby, of a torque shaft, an irreversible mechanical driving gear located adjacent the control surface for imparting movement from the torque shaft to the control surface, a pair of variable speed power units each comprising a constantly running electric motor, a hydraulic pump, having a variable and reversible delivery, driven by the electric motor, a hydraulic motor driven by the pump, a differential gear transmitting the drive from the two hydraulic motors to the torque shaft, a connection between the pilot's control member and each hydraulic pump for causing the pump, on movement of said control member, to drive its associated motor in a direction and at a speed corresponding to the direction and speed of movement of said control member, a follow-up gear between the differential gear and the pumps for terminating delivery of the pumps when the control surface has assumed a position selected by the control member, and means for preventing reverse rotation of either power unit, should it fail, by the other power unit.

4. In an aircraft, the combination claimed in claim 3, wherein each power unit includes a lock normally held in free position by the hydraulic pressure and a spring for moving the lock into position to lock the hydraulic motor of that power unit against rotation in the event of failure of hydraulic pressure in that unit.

5. In an aircraft, the combination, with a pilot's control member and a control surface to be operated thereby, of a torque shaft, an irreversible mechanical driving gear located adjacent the control surface for imparting movement from the torque shaft to the control surface, a pair of variable speed power units each comprising a constantly running electric motor, a hydraulic pump, having a variable and reversible delivery, driven by the electric motor, a hydraulic motor driven by the pump, a differential gear transmitting the drive from the two hydraulic motors to the torque shaft, a master and slave unit interposed between the pilot's control member and each power unit, each master and slave unit comprising a transmitter connected to the control member and a receiver connected to the hydraulic pump of the associated power unit and operative, on movement of the control member, to cause the pump to drive its associated motor in a direction and at a speed corresponding to the direction and speed of movement of said control member, a follow-up gear between the differential gear and the pumps for terminating delivery of the pumps when the control surface has assumed a position selected by the control member, and means for preventing reverse rotation of either power unit, should it fail, by the other power unit.

6. In an aircraft, the combination claimed in claim 5, wherein the follow-up gear comprises a differential gear having a planet carrier and a pair of sun wheels, means controlled by the receiver of the associated master and slave unit for moving the planet carrier in relation to the sun wheels, a connection between one of the sun wheels and a member for controlling the delivery of the associated hydraulic pump, and a connection between the other sun wheel and the differential gear driving the torque shaft.

7. In an aircraft, the combination, with a pilot's control member and a control surface to be operated thereby, of a pair of variable speed power units controlled by the pilot's control member and operative, on movement of the control member, to move the control surface to a position and at a rate determined by the movement of said control member, a torque shaft, a differential gear for imparting movement to the torque shaft from the two power units, means for preventing reverse rotation of either power unit, should it fail, by the other power unit, and at least one screw jack located close to the control surface for imparting movement thereto from the torque shaft.

8. In an aircraft, the combination claimed in claim 7, wherein the control surface is divided into at least three sections, and comprising a drive shaft driven from the torque shaft and extending parallel to the hinge axis of the control surface, an individual screw jack for imparting movement to each section of the control surface from the drive shaft, and a shear key associated with each screw jack, said shear key being adapted to fracture, in the event of seizure of the screw jack, to allow of continued rotation of the torque shaft and drive shaft.

9. In an aircraft having a pressure cabin, the combination with a pilot's control member and a control surface to be operated thereby, of a pair of variable speed power units located within the pressure cabin, said power units being controlled by the pilot's control member and operative, on movement of the control member, to move the control surface to a position and at a rate determined by the movement of said control member, a torque shaft extending out of the pressure cabin and towards the control surface, a differential gear within the pressure cabin for imparting movement to the torque shaft from the two power units, means for preventing reverse rotation of either power unit, should it fail, by the other power unit, and an irreversible mechanical driving gear close to the control surface for imparting movement thereto from the torque shaft.

10. In an aircraft, the combination, with a pilot's control member and a control surface to be operated thereby, of a torque shaft, an irreversible mechanical driving gear located adjacent the control surface for imparting movement from the torque shaft to the control surface, a pair of variable speed power units, a differential gear coupling the power units to the torque shaft, said differential gear comprising a planet carrier geared to the torque shaft, a pair of sun wheels each mounted on a shaft adapted to be clutched to one of the power units when said power unit is in position to drive said differential gear, a lock associated with each of said shafts which is held disengaged when the associated power unit is so positioned, and a spring associated with each lock for moving the same to lock the shaft of the associated sun wheel against rotation on removal of the associated power unit from position to drive said differential gear, connections between the pilot's control member and the power units for rendering the power units operative, on movement of the pilot's control member, to move the control surface in a direction and at a rate determined by the movement of the pilot's control member, means for terminating operation of the power units on arrival of the control surface at a position selected by the movement of the control member, and means for preventing reverse rotation of either power unit, should it fail, by the other power unit.

11. In an aircraft, the combination, with a pilot's control member and an elevator to be operated thereby, of a two-section torque shaft, an irreversible mechanical driving gear located adjacent the elevator for imparting movement from the torque shaft to the elevator, a pair of variable speed power units, a differential gear coupling the power units to the torque shaft, connections between the pilot's control member and the power units for rendering the power units operative, on movement of the pilot's control member, to move the elevator in a direction and at a rate determined by the direction and rate of movement of the pilot's control member, means for terminating operation of the power units on arrival of the elevator at a position selected by the movement of the control member, means for preventing reverse rotation of either power unit, should it fail, by the other power unit, a subsidiary differential gear interposed between the two sections of the torque shaft, said subsidiary differential gear comprising a pair of sun wheels each coupled to one section of the torque shaft, and a planet carrier, an electric motor, and an irreversible drive between said electric motor and the planet carrier of said second differential gear, said electric motor permitting of emergency operation of the elevator in the event of failure of both power units.

12. In an aircraft, the combination, with a pilot's control member and a control surface to be operated thereby, of a torque shaft, an irreversible mechanical driving gear located adjacent the control surface for imparting movement from the torque shaft to the control surface, a pair of variable speed power units, a differential gear coupling the power units to the torque shaft, connections between the pilot's control member and the power units for initiating, on movement of the pilot's control member, operation of the power units to drive the torque shaft in a direction and at a rate determined by the direction and rate of movement of the control member, a follow-up gear connecting the differential gear and the power units for terminating operation of the power units when the control surface has assumed a position determined by the position of the control member, and means for preventing reverse rotation of either power unit, should it fail, by the other power unit.

HENRY KNOWLER.
FRANK HENRY ROBERTSON.

REFERENCES CITED

The following references are of record in the file of this patent:

UNITED STATES PATENTS

| Number | Name | Date |
|---|---|---|
| 1,076,416 | Gammeter | Oct. 21, 1913 |
| 2,222,886 | Voigt | Nov. 26, 1940 |
| 2,295,306 | Tampier | Sept. 8, 1942 |
| 2,406,374 | Holt | Aug. 27, 1946 |
| 2,412,027 | Alexanderson | Dec. 3, 1946 |